United States Patent

Crain et al.

[11] Patent Number: 5,980,809
[45] Date of Patent: Nov. 9, 1999

[54] METHOD FOR MOLDING A PLASTIC WASHING MACHINE BASKET

[75] Inventors: Jack L. Crain, Marion; P. Randell Gray, Johnston City; Melvin D. Colclasure, Marion, all of Ill.

[73] Assignee: Maytag Corporation, Newton, Iowa

[21] Appl. No.: 08/324,781

[22] Filed: Oct. 14, 1994

Related U.S. Application Data

[62] Division of application No. 08/011,893, Feb. 1, 1993, Pat. No. 5,881,909.

[51] Int. Cl.⁶ .................................................. B29C 45/40
[52] U.S. Cl. ........................ 264/318; 249/64; 264/328.1; 264/334; 425/577; 425/DIG. 58
[58] Field of Search ............................... 264/318, 328.1, 264/334; 249/64, 140, 144, 145, 150; 425/330, 438, 468, 577, DIG. 58

[56] References Cited

U.S. PATENT DOCUMENTS

| | | |
|---|---|---|
| 382,149 | 5/1888 | Fowles . |
| 1,781,301 | 11/1930 | Randall . |
| 2,434,476 | 1/1948 | Wales . |
| 2,586,794 | 2/1952 | Douglas . |
| 2,647,632 | 8/1953 | Scheele . |
| 2,904,982 | 9/1959 | Bochan . |
| 3,145,551 | 8/1964 | Ziegler . |
| 3,249,230 | 5/1966 | Clement . |
| 3,555,607 | 1/1971 | Epain et al. . |
| 3,672,799 | 6/1972 | Liebertz et al. . |
| 3,816,047 | 6/1974 | Mohler ..................................... 425/577 |
| 3,905,740 | 9/1975 | Lovejoy . |
| 4,005,101 | 1/1977 | Ruch . |
| 4,044,092 | 8/1977 | Spears . |
| 4,125,246 | 11/1978 | von Holdt . |
| 4,383,819 | 5/1983 | Letica . |
| 4,520,061 | 5/1985 | Stoll et al. ................................. 249/64 |
| 4,521,367 | 6/1985 | Underwood . |
| 4,531,703 | 7/1985 | Underwood . |
| 4,618,121 | 10/1986 | Conti . |
| 4,648,834 | 3/1987 | Von Holdt . |
| 4,670,199 | 6/1987 | Montet et al. . |
| 4,764,103 | 8/1988 | Mitake . |
| 4,777,004 | 10/1988 | Galer . |
| 4,806,301 | 2/1989 | Conti . |
| 4,854,849 | 8/1989 | Sudo . |
| 4,903,852 | 2/1990 | Masumoto . |
| 4,920,661 | 5/1990 | Fukuzawa et al. . |
| 4,933,133 | 6/1990 | Brown et al. . |
| 5,065,671 | 11/1991 | Tameris . |
| 5,167,898 | 12/1992 | Luther . |
| 5,287,989 | 2/1994 | Luther . |

FOREIGN PATENT DOCUMENTS

| | | |
|---|---|---|
| 0 152 745 | 8/1985 | European Pat. Off. . |
| 62-30799 | 7/1987 | Japan . |

*Primary Examiner*—Jill L. Heitbrink
*Attorney, Agent, or Firm*—Everett G. Diederiks, Jr.

[57] ABSTRACT

A method and apparatus for molding a plastic washing machine basket includes a fixed mold core formed with teardrop-shaped projections spaced about a periphery thereof, cavity sidewall members spaced about the periphery of the mold core which carry core pins having tips adapted to abut teardrop-shaped projections on the mold core and a cavity cover member spaced about an end of the mold core and abutting the cavity sidewall members so as to define a cavity between the mold core and both the cavity cover member and the sidewall members. After injecting a plastic material to flow about the tips of the core pins and the projections so as to fill the cavity and form a plastic washing machine basket having an annular sidewall extending from a peripheral portion of a base wall with spaced apertures extending through the sidewall and teardrop-shaped grooves in an inner surface thereof extending from the apertures, the plastic washing machine basket can be ejected from the molding apparatus by separating the mold core and the cavity cover member and shifting the cavity sidewall members away from the mold core at a predetermined angle such that the core pins force the plastic washing machine basket to be removed from the mold core due to engagement of the core pins in the apertures of the basket.

35 Claims, 5 Drawing Sheets

METHOD FOR MOLDING A PLASTIC WASHING MACHINE BASKET

This application is a division of application Ser. No. 08/011,893, filed on Feb. 1, 1993 now U.S. Pat. No. 5,881,909.

BACKGROUND OF THE INVENTION

1. Field of the Invention

The present invention pertains to the art of washing machines and, more particularly, to a plastic washing machine basket along with a method and apparatus for making the same.

2. Discussion of the Prior Art

Washing machine baskets are generally formed from metal and include spaced holes in both a base wall and an annular sidewall thereof. In accordance with the prior art, normally these holes are perforated subsequent or prior to shaping the metal basket. This multi-step manufacturing method is costly and time consuming.

It has also heretofore been proposed to form a washing machine basket from a plastic material. Attempts have been made to mold such plastic washing machine baskets in an apparatus which would simultaneously form the desired apertures in the base wall and annular sidewall of the basket. However, such attempts have proved unsuccessful and have resulted in plastic baskets having numerous knit lines formed on the inner surface of the basket. Knit lines cause reduced structural integrity and visually indicate defects. Alternatively, it has also been proposed to mold a plastic washing machine basket as a unitary structure and then perforate the holes during a subsequent manufacturing step. This method leaves burrs and sharp edges that would result in damage to garments washed in the basket. Again, this need for multiple manufacturing steps is undesirable and results in increased manufacturing costs.

Therefore, there exists a need in the art for a method and apparatus for molding a plastic washing machine basket with holes in the base wall and annular sidewall thereof, without forming undesirable knit lines, in a single manufacturing step.

SUMMARY OF THE INVENTION

It is an object of the present invention to provide a plastic washing machine basket which can be molded in a single manufacturing step with holes formed in both a base wall and an annular sidewall of the basket without undesirable knit lines on the inner surface of the basket.

It is a further object of the present invention to provide a method and an apparatus for molding a plastic washing machine basket without knit lines on the inner surface thereof while forming the basket with spaced holes in both a base wall and an annular sidewall thereof.

These and other objects of the present invention are accomplished by providing a molding apparatus comprising a mold core which is fixed at one end and includes teardrop-shaped projections spaced about an outer periphery thereof, a plurality of cavity sidewall members being movable between an open mold position, in which the cavity sidewall members have been shifted at a predetermined angle away from the mold core, and a closed mold position, in which the cavity sidewall members extend about the outer periphery of the mold core with a first predetermined space therebetween, and a cavity cover member extending about the second end of the mold core with a second predetermined space therebetween and abutting the cavity sidewall members when in a closed mold position but being spaced from the cavity sidewall members when in an open mold position. The cavity sidewall members carry core pins having terminal ends which project toward and abut the teardrop-shaped projections of the mold core when the cavity sidewall members are in the closed mold position.

By this arrangement, when a plastic material is injected into the first and second predetermined spaces, the plastic material will flow about the core pins and the projections so as to form a plastic washing machine basket having an annular sidewall extending upward from a peripheral portion of a base wall wherein the sidewall will have inner and outer surfaces with spaced apertures extending therethrough and teardrop-shaped grooves extending from the apertures. After cooling of the plastic material, the various core pins are used to remove the molded plastic washing machine basket from the mold core during an ejection process by shifting the basket relative to the mold core through the interengagement of the core pins with the apertures formed in the sidewall of the basket. A stripper ring and an ejection system, are also provided to aid in removing the molded basket from the mold core.

Other objects, features and advantages of the invention will become more readily apparent from the following detailed description of preferred embodiments thereof when taken in conjunction with the drawings wherein like reference characters refer to corresponding parts in the several views.

DETAILED DESCRIPTION OF THE INVENTION

Figure 1:
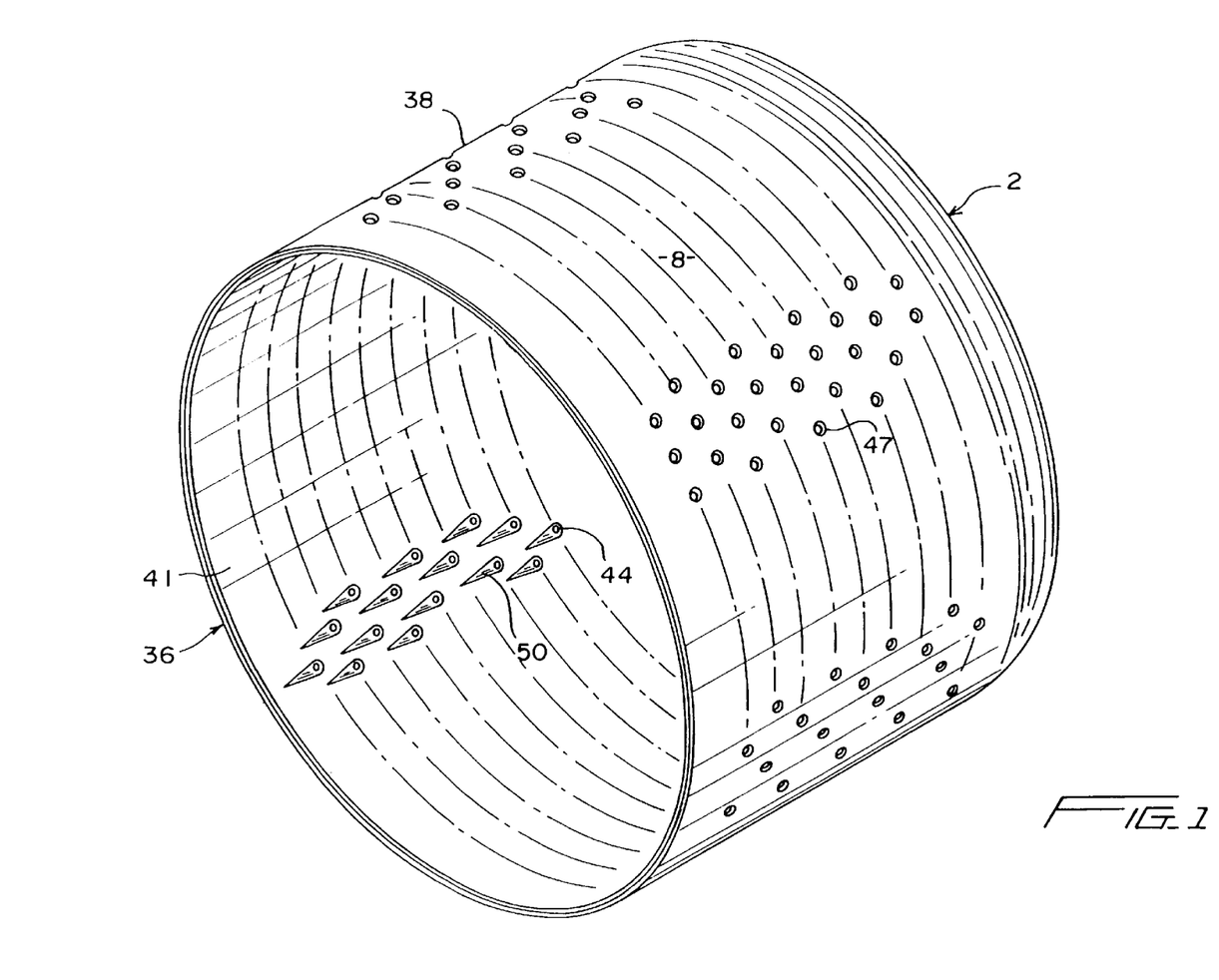
FIG. 1 depicts a perspective view of the plastic washing machine basket of the invention.
Figure 2:
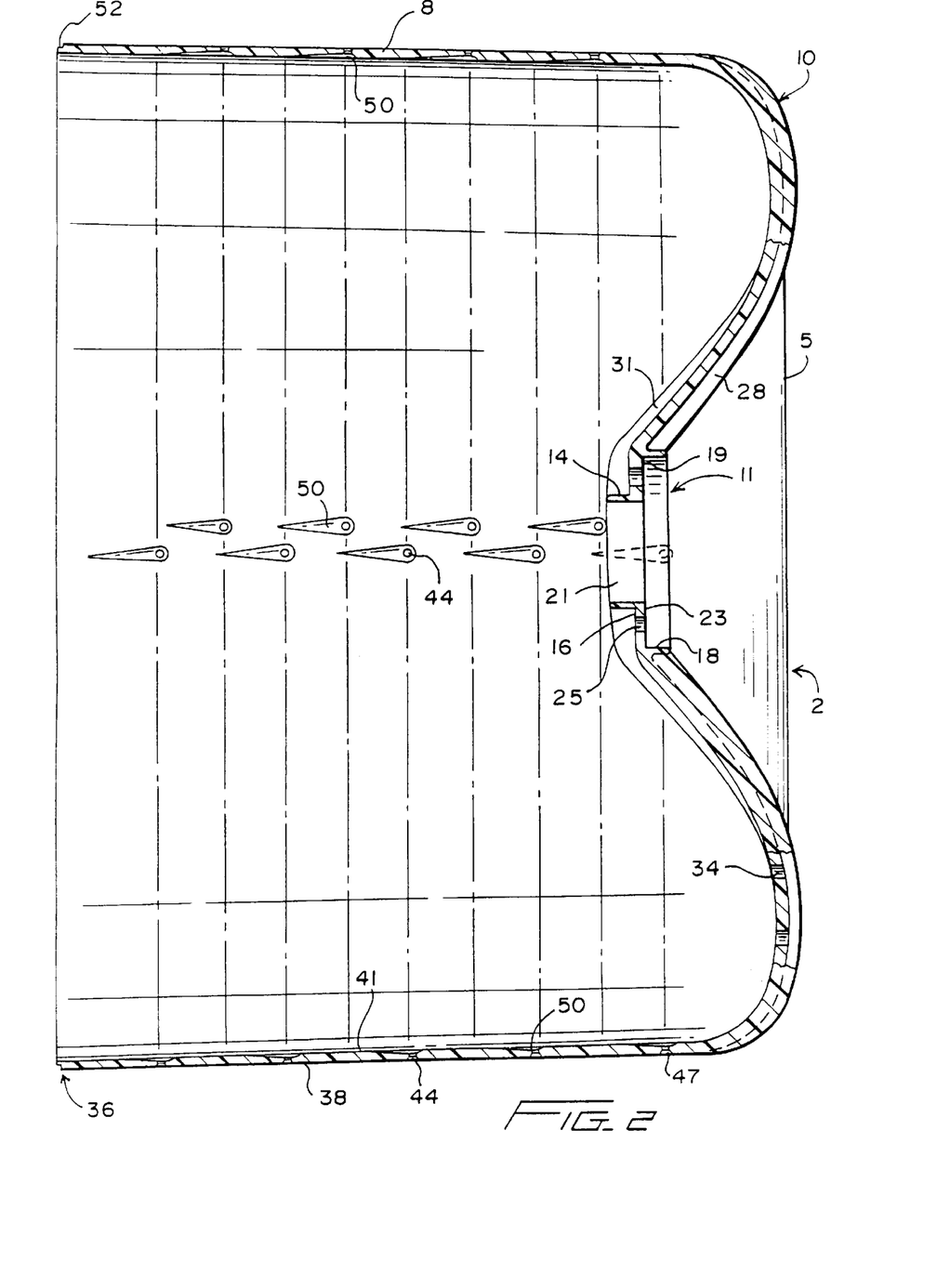
FIG. 2 depicts a partial, cross-sectional view of the plastic washing machine basket of FIG. 1.

The plastic washing machine basket 2 of the invention will be explained with reference to FIGS. 1 and 2. Basket 2 includes a base wall 5 and an annular sidewall 8 extending from a peripheral portion 10 of base wall 5. Basket 2 further includes a mounting portion 11 having a first annular flange 14 projecting into the interior of basket 2 from an inner surface 16 of base wall 5 and a second annular flange 18 which extends away from an outer surface 19 of base wall 5. First annular flange 14 defines a central throughhole 21 through which an output shaft of a drive train including an electric drive motor or the like (not shown) may extend, as is known in the art. Radially between first annular flange 14 and second annular flange 18, outer surface 19 of base wall 5 defines a circular mounting flat 23 having spaced mounting holes 25 extending therethrough. Mounting flat 23 is adapted to secure basket 2 to a drive train carried support structure, such as a drive plate (not shown), by any type of fastening means known in the art and extending through mounting holes 25.

Outer surface 19 of base wall 5 is formed with a plurality of spaced lower ribs 28 which extend from second annular flange 18 and merge with outer surface 19 adjacent peripheral portion 10. In a similar manner, a plurality of spaced upper ribs 31 extend along inner surface 16 of base wall 5 from first annular flange 14. Ribs 28 and 31 provide additional structural rigidity for mounting portion 11. Base wall 5 is also formed with a plurality of drain holes 34 which extend through inner and outer surfaces 16, 19 of base wall 5.

As previously stated, annular sidewall 8 extends from peripheral portion 10 of base wall 5 to a terminal edge 36. Sidewall 8 is defined by an outside surface 38 and an inside surface 41 through which a plurality of apertures 44 extend. Apertures 44 are spaced along the length of sidewall 8 in alternating rows, as generally depicted in both FIGS. 1 and 2. For the sake of clarity in these figures, apertures 44 have not been shown to extend entirely around the circumference of sidewall 8. However, in the preferred embodiment, apertures 44 are provided around the entire circumference of sidewall 8 and are slightly and progressively reduced in diameter from adjacent base wall 5 toward terminal edge 36. At outside surface 38, apertures 44 are beveled at 47. In addition, inside surface 41 of sidewall 8 is formed with teardrop-shaped grooves 50 which extend about apertures 44. Teardrop-shaped grooves 50 generally taper along their length, in both width and depth, from base wall 5 toward terminal edge 36 such that apertures 44 are located in substantially the widest and deepest portions of teardrop-shaped grooves 50. Finally, terminal edge 36 of sidewall 8 is provided with an outer annular notch 52 for the reasons which will be more fully discussed below.

Figure 3:
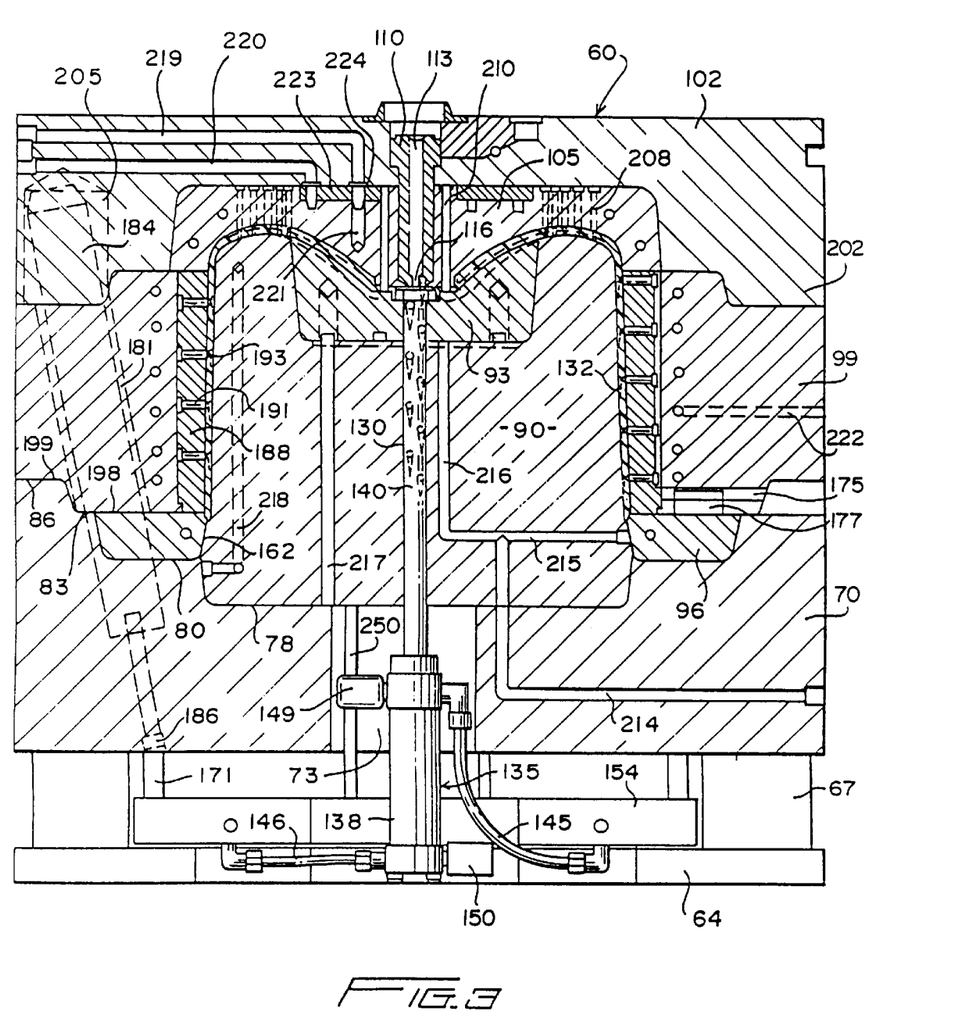
FIG. 3 is a cross-sectional view of an apparatus for molding the plastic washing machine basket of FIG. 1 in a closed mold position.
Figure 4:
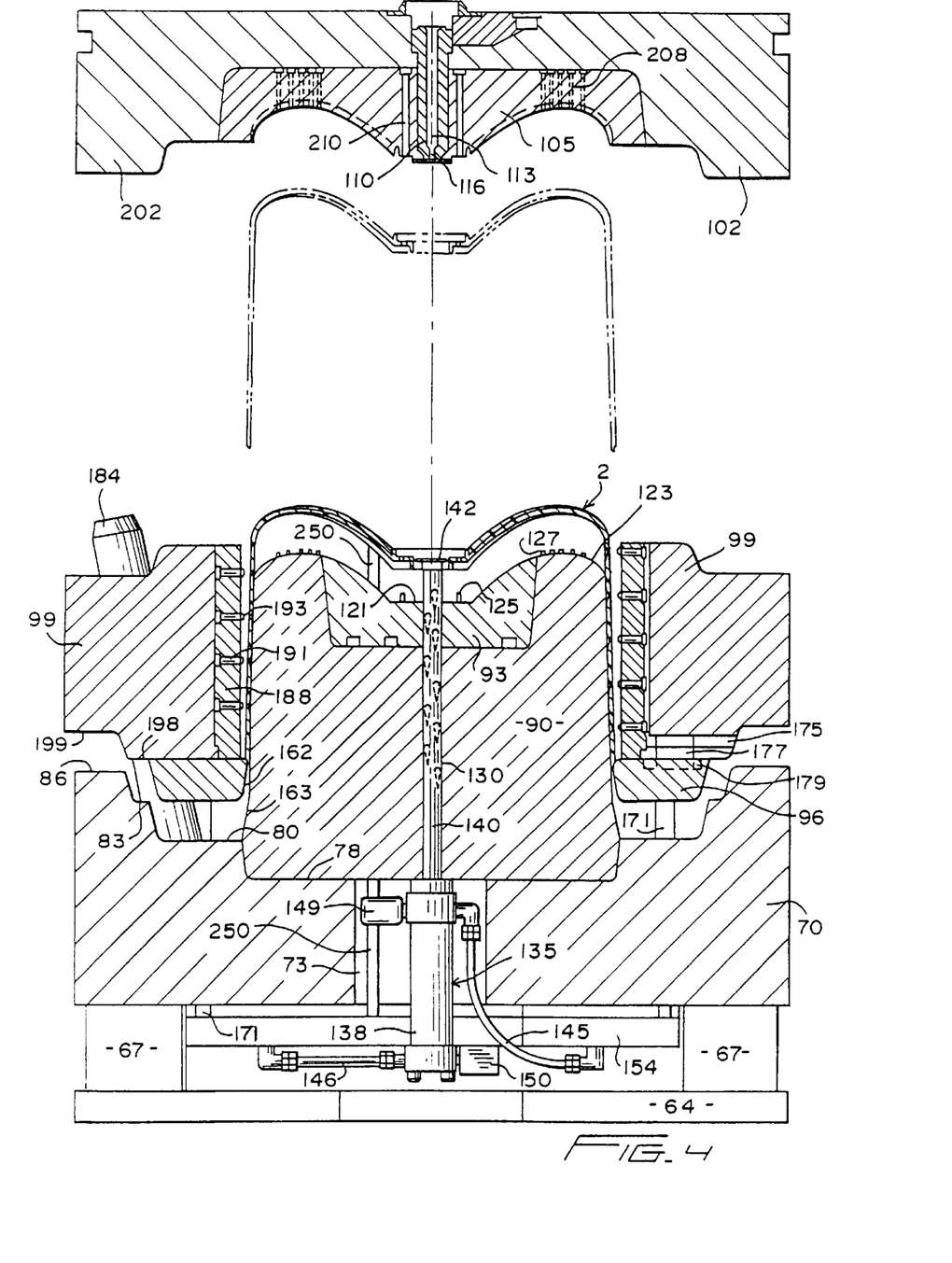
FIG. 4 depicts a cross-sectional view of the molding apparatus shown in FIG. 3 in an open mold position.
Figure 5:
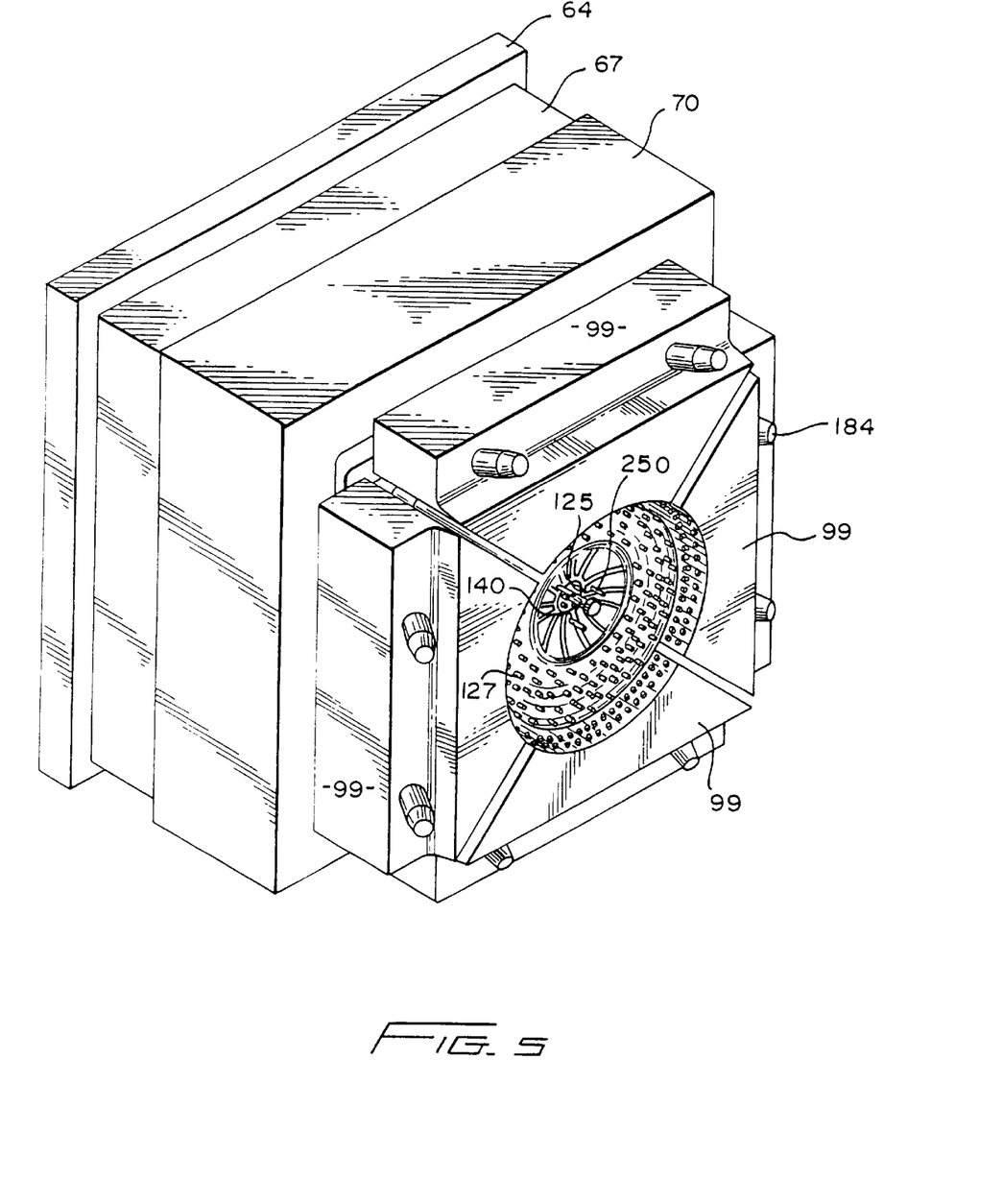
FIG. 5 is a partial, perspective view of the molding apparatus shown in FIGS. 3 and 4.

Reference will now be made to FIGS. 3–5 in describing an apparatus 60 for molding plastic washing machine basket 2. Apparatus 60 comprises a mounting plate 64 to which a plurality of support rails 67 are secured. A core support block 70 having a central throughhole 73 is fixedly mounted to support rails 67. The upper portion of core support block 70 includes a base surface 78, a lower plateau 80, an intermediate plateau 83 and an upper plateau 86. A mold core 90 is secured to base surface 78 of core support block 70. Mold core 90 includes a core insert 93. The molding apparatus 60 further includes a stripper ring 96 which rests upon lower plateau 80 of core support block 70, a plurality of cavity sidewall members 99 which extend about the periphery of mold core 90 with a first space therebetween and a cavity cover member 102, which has secured thereto a cover insert 105, extending about an end of mold core 90 with a second space therebetween and abutting cavity sidewall members 99 when in a closed mold position. Cavity cover member 102 and cover insert 105 include an aligned throughhole (not labeled) within which an injection tube 110 is secured. Injection tube 110 includes an injection passage 113 which terminates in a nozzle 116 for introducing a flow of plastic material within the spaces between mold core 90 and both cavity cover member 102 and cavity sidewall members 99. The particular structure and interrelationship of the elements which comprise molding apparatus 60 as briefly discussed above will now be individually described in detail below.

Mold core 90 includes a trough portion 121 (see FIG. 4) and a crest portion 123. Mold core 90 is formed with a plurality of pins 125 which extend from trough portion 121 and a plurality of pins 127 which extend from crest portion 123. Mold core 90 is further provided with a central bore 130 and a plurality of teardrop-shaped projections 132 which are spaced substantially about the entire outer periphery of mold core 90. Teardrop-shaped projections 132 define the length, width and depth of teardrop-shaped grooves 50 in plastic washing machine basket 2 discussed above.

Located in central through hole 73 is a hydraulic actuator 135 comprising a cylinder 138 and an ejector rod 140 which extends through bore 130 and terminates in a plate 142. Although not detailed in the drawings, hydraulic actuator 135 is constructed in a manner known in the art wherein ejector rod 140 carries a piston at the end opposite terminal plate 142 such that the piston can move within cylinder 138 and defines upper and lower chambers on opposite sides thereof. A first hydraulic line 145 extends into the upper chamber in hydraulic actuator 135 while a second hydraulic line 146 extends into the lower chamber. By adjusting the supply of hydraulic fluid through first and second hydraulic lines 145 and 146, ejector rod 140 can be extended or retracted relative to cylinder 138. Upper and lower limit switches 149 and 150 are provided to indicate upper and lower displacement limits for the piston within cylinder 138. In the preferred embodiment, cylinder 138 of hydraulic actuator 135 is secured to a plate 154 which is movable between lower and upper limits as represented in FIGS. 3 and 4 respectively. The movement of plate 154 will be more fully discussed below.

Stripper ring 96 includes a tapered inner wall 162 which is adapted to conform to and seal against a tapered outer surface 163 of mold core 90 when molding apparatus 60 is in the closed mold position depicted in FIG. 3. Stripper ring 96 is adapted to be shifted between the position shown in FIG. 3 to that shown in FIG. 4 so as to aid in ejecting plastic washing machine basket 2 from molding apparatus 60. In order to shift the stripper ring 96, a plurality of rods 171 are fixedly secured between stripper ring 96 and movable plate 154 such that when movable plate 154 is shifted from the position shown in FIG. 3 to the position shown in FIG. 4 by any means known in the art (not shown), stripper ring 96 will be lifted from lower plateau 80 of support block 70.

As previously stated, cavity sidewall members 99 extend about the periphery of core 90 and are mounted upon stripper ring 96. In the preferred embodiment, as best shown in FIG. 5, four such cavity sidewall members 99 are utilized. Adjacent stripper ring 96, each cavity sidewall member 99 is provided with a groove 175 within which a guide pin 177, secured to stripper ring 96 by means of a plate 179, extends. Grooves 175 extend laterally within cavity sidewall members 99, as shown in FIGS. 3 and 4. In the preferred embodiment, both the guide pins 177 and grooves 175 are formed from a wear resistant and low friction material so as to permit cavity sidewall members 99 to slide relative to stripper ring 96 in a laterally outward direction as shown in FIGS. 3 and 4. Molding apparatus 60 further includes a means to automatically shift and guide cavity sidewall members 99 relative to stripper ring 96 upon lifting of stripper ring 96 from lower plateau 80. This guide arrangement not only includes grooves 175 and guide pins 177 but further includes angled bores 181 (see FIG. 3) extending through cavity sidewall members 99 within which are received guide rods 184 secured to core support block 70 at 186. Therefore, by this arrangement, when stripper ring 96 is lifted from the position shown in FIG. 3 to the position shown in FIG. 4, cavity sidewall members 99 will also be lifted and will be forced to shift laterally outwardly due to the presence of guide rods 184 in angled bores 181.

Each cavity sidewall member 99 further includes an inner plate 188 fixedly secured thereto. Inner plate 188 carries numerous spaced core pins 191 (540 core pins being utilized in the preferred embodiment of the invention). Core pins 191 include beveled tips 193 each of which is adapted to engage a corresponding teardrop-shaped projection 132 formed about the periphery of mold core 90 when molding apparatus 60 is in its closed mold position. In the closed mold position, a lower tier 198 of the cavity sidewall members 99 rests upon stripper ring 96 and intermediate plateau 83 of core support block 70 while an upper tier 199 of cavity sidewall members 99 rests upon upper plateau 86 of core support block 70.

A more detailed description of cavity cover member 102 will now be provided. Cavity cover member 102 includes an annular flange portion 202 which is adapted to abut cavity sidewall members 99 when molding apparatus 60 is in the closed mold position as shown in FIG. 3 and which is spaced from cavity sidewall members 99 when molding apparatus 60 is in an open mold position as depicted in FIG. 4. It should be readily recognized that molding apparatus 60 can be changed between its open and closed mold positions by linearly shifting either cavity cover member 102 relative to mold core 90 or vice versa by any means known in the art (not shown) such as hydraulic or pneumatic linear actuators while shifting the cavity sidewall members 99 away from mold core 90 at a predetermined angle as discussed above. In the preferred embodiment, mold core 90 is shifted relative to cavity cover member 102. In the closed mold position, bores 205 formed in cavity cover member 102 extend about guide rods 184 to substantially close molding apparatus 60 and prevent shifting of cavity sidewall members 99. Cover insert 105 of cavity cover member 102 includes numerous pins 208 which are adapted to abut respective pins 127 formed on crest portion 123 of mold core 90 along with hollow pins 210 for receiving pins 125 on trough portion 121 when molding apparatus 60 is in the closed mold position.

The particular manner in which molding apparatus 60 is used to form plastic washing machine basket 2 along with the unique method of removing plastic washing machine basket 2 from mold core 90 will now be explained. As previously stated, molding apparatus 60 is depicted in a closed mold position in FIG. 3. In this position, a plastic material may be injected through passage 113 and nozzle 116 into the spaced defined between mold core 90 and both cover insert 105 of cavity cover member 102 and cavity sidewall members 99. The interconnection between pins 127, 208 and 125, 210 respectively will prevent the plastic material from flowing into these areas to form mounting holes 25 and drain holes 34 in basket 2. The plastic material will then continue to flow over crest portion 123 of mold core 90 and between mold core 90 and cavity sidewall members 99. At this point, the plastic material will flow about the beveled tips 193 of core pins 191, which extend substantially perpendicular to the longitudinal axis of mold core 90, and the teardrop-shaped projections 132 in order to form beveled apertures 44 and the teardrop-shaped grooves 50 in basket 2. It is important to note that the teardrop-shaped projections 132 permit the plastic material to flow around core pins 191 without creating knit lines which would inherently be formed without the presence of the teardrop-shaped projections 132, and thereby basket 2 can be formed with a smooth inner surface 41.

Once the flow of plastic material is cut off, the plastic material is given a sufficient amount of time to cool. Cooling of the plastic material along with molding apparatus 60 is preferably enhanced by providing various cooling lines 214–222 which extend throughout molding apparatus 60 in a manner known in the art. Various attachment plates, such as that indicated at 223, may be utilized to interconnect various tubes and passages between, for example, cavity cover member 102 and cover insert 105 and mold core 90 and mold insert 93 with 0-rings 224 therebetween. As the use of such cooling lines and attachment methods therefor are widely known in the art and not considered part of the present invention, these will not be further described herein.

Molding of basket 2 with a smooth inner surface 41 creates a problem in removing basket 2 since the basket 2 will tend to adhere to the outer peripheral surface of mold core 90. The use of an injection rod and a stripper ring to remove a molded article from a mold core is known in the art. However, these two elements alone could not sufficiently remove basket 2 from mold core 90 without severely damaging basket 2. To remedy this problem, during the initial ejection phase of basket 2, cavity cover member 102 is shifted away from cavity sidewall members 99 such that bores 205 are separated from guide rods 184. Stripper ring 96, which engages notch 52 provided about the terminal edge 36 of basket 2, is shifted upward by means of rods 171. Since cavity sidewall members 99 are supported upon stripper 96, cavity sidewall members 99 will also be shifted relative to mold core 90. As previously stated, the position of cavity sidewall members 99 relative to mold core 90 during shifting of stripper ring 96 is determined based on the particular guiding arrangement provided. More specifically, as stripper ring 96 is lifted off lower plateau 80, cavity sidewall members 99 will be lifted and shifted laterally relative to mold core 90. During the initial lifting of stripper ring 96, each of the core pins 191 will be engaged within a respective aperture 44 of basket 2 to provide a lifting force about the entire periphery of mold core 90. This lifting force is aided by both the ejection rod 140 and stripper ring 96 and enables basket 2 to be removed from mold core 90 without being damaged. Air lines (not shown), along with additional ejector rods 250 (see FIGS. 3–5) which are secured to movable plate 154, extend through core 90 and are adapted to engage basket 2, may also be provided to further aid the ejection process. By the time basket 2 has reached the ejection position shown in FIG. 4, the cavity sidewall members 99 have been laterally shifted a distance sufficient to completely remove the beveled tips 193 of core pins 191 from apertures 44. The outer peripheral surface of core mold 90 diverges slightly inwardly from bottom to top as shown FIGS. 3 and 4 such that when basket 2 reaches the position shown in FIG. 4, it can be freely removed from mold core 90 by extending ejector rod 140 relative to cylinder housing 138 so as to be located above mold core 90, at which point basket 2 can be readily removed by means of a robot arm or other transport system. It should be noted that basket 2 will be formed with a thin layer of plastic (not shown) extending across central through hole 21 which is later removed. It is this thin layer of plastic that terminal plate 142 of ejector rod 140 engages.

Locating core pins 191 at the thickest or crown portion of teardrop-shaped projections 132 and providing bevel tips 193 permit core pins 191 to be removed from apertures 44 without marring inner surface 41 of basket 2. The use of a solid mold core 90 prevents forming sectional lines inside basket 2, a result which could not be realized if a sectional mold core was utilized. As previously stated, the core pins 191 are arranged in a spaced and alternate fashion such that the plastic material is permitted to flow around tips 193 and teardrop-shaped projections 132 in a streamlined manner to thereby substantially eliminate the formation of knit lines. The shape of the teardrop-shaped projections 132 not only provides for the effective flow of the plastic material, but also forms the teardrop-shaped grooves 50 which improve washability by increasing the coupling of water and clothing inserted into basket 2. In addition, since holes 44 are recessed within the teardrop-shaped grooves 50, any edges on the holes 44 will be prevented from snagging clothes placed in basket 2.

Although described with respect to a preferred embodiment, it should be understood that various changes and/or modifications can be made to the invention without departing from the spirit thereof. In particular, although various references have been made to directions when referring to FIGS. 3 and 4, it should be understood that the molding apparatus of the present invention can be used to form plastic washing machine baskets at any angle and is actually horizontally mounted as depicted in FIG. 5 to provide for easy access to the molding area. In general, the invention is only intended to be limited by the scope of the following claims.

We claim:

1. A method of making a plastic washing machine basket in an apparatus including a mold core formed with teardrop-shaped projections spaced about a periphery thereof, cavity sidewall members spaced about the periphery of the mold core which carry core pins having tips adapted to abut the projections on the mold core and a cavity cover member spaced about an end of the mold core and abutting the cavity sidewall members so as to define a cavity between the mold core and both the cavity cover member and cavity sidewall members comprising:

injecting a plastic material to fill the cavity while flowing about the tips of the core pins and the projections to form a plastic washing machine basket having sidewalls with apertures extending therethrough and teardrop-shaped grooves in an inner surface thereof extending from the apertures; and ejecting the washing machine basket from the apparatus by separating the mold core and cavity cover member and shifting the cavity sidewall members away from the mold core at a predetermined angle such that the core pins force the plastic washing machine basket to be removed from the mold core due to the engagement of the core pins in the apertures of the basket.

2. The method of claim 1, further comprising aiding in ejecting the washing machine basket by substantially, linearly shifting a stripper ring engaging a terminal annular edge of the basket relative to the mold core.

3. The method of claim 2, further comprising aiding in ejecting the washing machine basket by substantially, linearly shifting at least one ejector rod, which engages the basket, relative to the mold core.

4. A method for manufacturing a one-piece plastic washing machine tub including a bottom wall and a cylindrical sidewall extending transversely from the bottom wall and including therein a plurality of holes, the holes being recessed from the interior surface of the cylindrical sidewall by depressions, said method employing a mold assembly including opposed first and second mold dies, a central mold core extending from the first mold die, the mold core including a plurality of teardrop-shaped projections each converging toward the narrowed end thereof in the same direction, and a plurality of side mold dies around the mold core, each of the side mold dies including a plurality of core pins, said method comprising the steps of:

moving the first and second mold dies and the side mold dies to a mold closed position wherein each of the core pins engages the enlarged end portion of one of the teardrop-shaped projections on the mold core and wherein the first and second mold dies and the side mold dies define a mold cavity conforming to the dimensions of the tub, injecting plastic into the mold cavity to form the molded tub, displacing the second mold die to an open position relative to the first mold die, displacing the mold side dies outwardly to withdraw the core pins from the holes formed thereby in the molded tub, and displacing the molded tub from the mold core in a direction opposite the direction in which the teardrop-shaped projections converge.

5. A method for manufacturing as set forth in claim 4 wherein the step of displacing the second mold die precedes the step of displacing the molded tub from the mold core.

6. A method for manufacturing as set forth in claim 5 wherein the step of displacing the molded tub from the mold core is performed simultaneously with the step of displacing the mold side dies, and is followed by the step of extending a rod member to further remove the molded tub from the mold assembly.

7. A method of making an integral, smooth and uniformly constructed plastic washing machine basket having a base wall including a peripheral portion from which extends an annular sidewall that diverges radially outwardly to a terminal edge in an apparatus including a mold core, cavity sidewall members spaced about the mold core which carry core pins each having a beveled tip portion adapted to abut the mold core during a molding operation and a cavity cover member spaced about an end of the mold core and abutting the cavity sidewall members so as to define a cavity between the mold core and both the cavity cover member and the cavity sidewall members comprising:

injecting a plastic material to fill the cavity while flowing around the beveled tip portion of each of the core pins to form a plastic washing machine basket having sidewalls provided with a plurality of spaced beveled apertures; and ejecting the washing machine basket from the apparatus by separating the mold core and cavity cover member and shifting the cavity sidewall members away from the mold core.

8. The method of claim 7, further comprising: utilizing the core pins to aid in ejecting the plastic washing machine basket from the apparatus with the core pins forcing the plastic washing machine basket to shift relative to the mold core as the cavity sidewall members are shifted away from the mold core due to the engagement of the core pins in the beveled apertures of the plastic washing machine basket.

9. The method of claim 8, further comprising: aiding in ejecting the washing machine basket by substantially, linearly shifting a stripper ring, that engages the terminal edge of the plastic washing machine basket, relative to the mold core.

10. The method of claim 7, further comprising: creating grooves which extend from the apertures in the plastic washing machine basket by forming the mold core with corresponding projections where the tip portions of the core pins engage the mold core.

11. An apparatus for molding a plastic washing machine basket having inner and outer sidewall surfaces with spaced apertures extending therethrough and teardrop-shaped grooves formed in the inner sidewall surface of the basket extending about the apertures, said apparatus comprising:

a mold core having a first fixed end, a second end, and a plurality of teardrop-shaped projections spaced about an outer periphery thereof;

a plurality of cavity sidewall members extending about the outer periphery of said mold core, each cavity sidewall member including a plurality of core pins having terminal ends which project toward said mold core from an inner surface of said cavity sidewall member, said cavity sidewall members being movable between open and closed mold positions such that when said cavity sidewall members are in a closed mold position, a first space is formed between the inner surfaces of the cavity sidewall members and the outer periphery of said mold core and the terminal ends of said core pins abut said teardrop-shaped projections, and when said cavity sidewall members are in an open mold position, the terminal ends of said core pins are spaced from the teardrop-shaped projections;

a cavity cover member extending about the second end of said mold core with a second space therebetween and abutting said cavity sidewall members when said apparatus is in a closed mold position and being spaced from said cavity sidewall members when said apparatus is in an open mold position; and means for injecting a plastic material into said first and second spaces to form a plastic washing machine basket.

12. The apparatus of claim 11, wherein each of said teardrop-shaped projections has an associated length which tapers in thickness.

13. The apparatus of claim 12, wherein said core pins abut said projections at the thickest portion thereof.

14. The apparatus of claim 11, wherein the terminal ends of said core pins are beveled.

15. The apparatus of claim 14, wherein said core pins extend substantially perpendicular to said mold core when said cavity sidewall members are in said closed mold position.

16. The apparatus of claim 11, further comprising a stripper ring and means for moving said stripper ring between open and closed mold positions, said cavity sidewall members being shiftably mounted upon said stripper ring.

17. The apparatus of claim 16, further including means for guiding the movement of said cavity sidewalls members relative to said stripper ring in response to activation of said moving means.

18. The apparatus of claim 17, wherein said guiding means comprises a plurality of angled rods which are fixed with respect to said mold core and extend through angled bores in said cavity sidewall members.

19. The apparatus of claim 18, wherein said guide means further comprises a device carried by said stripper ring which projects into a groove in a respective one of said cavity sidewall member.

20. A mold assembly for use in the manufacture of an article, said mold apparatus comprising:

a mold plate, a mold core projecting from said mold plate, said mold core including an outer surface portion adapted to form at least part of an interior surface of the article, said outer surface portion including a generally teardrop-shaped projection, a plurality of mold sidewall assemblies, each of said mold sidewall assemblies including an inwardly facing molding surface adapted to form a portion of an exterior surface of the article, means for supporting said mold sidewall assemblies for movement relative to said mold core and between a mold closed position wherein said inwardly facing molding surfaces and said mold core cooperate to define at least part of a mold cavity which conforms to the desired dimensions of the article, and a mold open position wherein each of said mold sidewall assemblies is displaced outwardly of its mold closed position, and a core pin supported on one of said mold sidewall assemblies, said core pin engaging said teardrop-shaped projection when said one mold sidewall assembly is in its mold closed position, and said core pin being adapted to form a hole in the article.

21. A mold assembly as set forth in claim 20 wherein said outer surface portion of said mold core includes a plurality of generally teardrop-shaped projections, each of said teardrop-shaped projections being adapted to form a teardrop-shaped depression in the interior surface of the article, and wherein said mold assembly includes a plurality of core pins, each of said core pins being supported on one of said mold sidewall assemblies projecting from said inwardly facing molding surface thereof, and engaging one of said teardrop-shaped projections when said mold sidewall assemblies are in their mold closed position to facilitate formation of a hole in the article, the hole being recessed in one of the teardrop-shaped depressions from the surrounding portion of the interior surface of the article.

22. A mold assembly as set forth in claim 20 wherein said teardrop-shaped projection includes a narrowed end portion and an enlarged end portion, said teardrop-shaped projection converging from said enlarged end portion toward said first mold plate to said narrowed end portion, and wherein said core pin engages said enlarged end portion of said teardrop-shaped projection when said one mold sidewall assembly is in its mold closed position.

23. A mold assembly as set forth in claim 20 wherein said mold core includes a longitudinal axis, and wherein said teardrop-shaped projection converges in a direction parallel to said longitudinal axis.

24. A mold assembly as set forth in claim 23 wherein said mold core includes a free end, and said outer surface portion of said mold core is annular and tapers inwardly toward said free end.

25. A mold assembly as set forth in claim 23 wherein said teardrop-shaped projection includes an outer surface having a longitudinal center line parallel to said longitudinal axis of said mold core, said center line extending tangentially to the outermost point of said enlarged end portion, and said center line defining an outer edge portion of said teardrop-shaped projection.

26. A mold assembly as set forth in claim 20 wherein said narrowed end portion gradually merges into said outer surface portion so as to provide a smooth transition therebetween.

27. A mold assembly as set forth in claim 20 wherein said teardrop-shaped projection has a periphery which is generally arcuate so as to converge into said surrounding outer surface portion to form a gradual transition therebetween.

28. A mold assembly as set forth in claim 20 wherein said enlarged end portion of said teardrop-shaped projection includes a center, and wherein said teardrop-shaped projection becomes gradually shallower as the periphery thereof is approached from said center.

29. A mold assembly for use in the manufacture of an article having an annular interior surface, said mold apparatus comprising:

a first mold plate, a second mold plate opposing said first mold plate, means for supporting said first and second mold plates for movement toward and away from each other between a mold open position and a mold closed position, a mold core projecting from said first mold plate in a direction parallel to the direction of movement of said first and second mold plates relative to one another, said mold core including a free end and an annular outer mold surface portion tapering inwardly in said direction and toward said free end and being adapted to form the annular interior surface of the article, said outer mold surface portion including a generally teardrop-shaped projection, said teardrop-shaped projection being adapted to form a teardrop-shaped depression in the annular interior surface of the article, a plurality of mold sidewall assemblies, each of said mold sidewall assemblies including an inwardly facing molding surface adapted to form a portion of the exterior surface of the article, means for supporting said mold sidewall assemblies for movement relative to said mold core and between a mold closed position wherein said inwardly facing molding surfaces and said mold core cooperate to define at least part of a mold cavity which conforms to the desired dimensions of the article, and a mold open position wherein each of said mold sidewall assemblies is displaced outwardly of its mold closed position, and a core pin supported on one of said mold sidewall assemblies, said core pin engaging said teardrop-shaped projection when said one mold sidewall assembly is in its mold closed position, and said core pin being adapted to form a hole in the article.

30. A mold assembly as set forth in claim 29 wherein said annular outer surface portion of said mold core includes a plurality of generally teardrop-shaped projections, each of said teardrop-shaped projections being adapted to form a teardrop-shaped depression in the annular interior surface of the article, and wherein said mold assembly includes a plurality of core pins, each of said core pins being supported on one of said mold sidewall assemblies, projecting from said inwardly facing molding surface thereof, and engaging one of said teardrop-shaped projections when said mold sidewall assemblies are in their mold closed position to facilitate formation of a hole in the article, the hole being recessed in one of the teardrop-shaped depressions from the surrounding portion of the annular interior surface of the article.

31. A mold assembly as set forth in claim 30 wherein each of said teardrop-shaped projections of said mold core includes an enlarged end portion and a narrowed end portion, each of said teardrop-shaped projections converging from said enlarged end portion thereof to said narrowed end portion thereof in a direction toward said first mold plate and parallel to said direction of movement of said first and second mold plates relative to one another, and wherein each of said core pins engages the enlarged end portion of one of said teardrop-shaped projections of said mold core when said mold sidewall assemblies are in their mold closed positions.

32. A mold assembly as set forth in claim 31 wherein each one of said teardrop-shaped projections includes an outer surface having a longitudinal center line parallel to said direction of movement of said first and second mold plates relative to each other, said center line extending tangentially to the outermost point of said enlarged end portion of said respective teardrop-shaped projection, and said center line defining an outer edge portion of said respective teardrop-shaped projection.

33. A mold assembly as set forth in claim 31 wherein said enlarged end portion of each of said teardrop-shaped projections includes a center, and wherein said teardrop-shaped projection becomes gradually shallower as the periphery thereof is approached from said center.

34. A mold assembly for use in an injection molding process to mold a one-piece article including a cylindrical sidewall extending transversely from a bottom wall, said mold assembly comprising:

a first mold plate, a second mold plate opposing said first mold plate and including an inwardly facing molding surface adapted to form the exterior side of the bottom wall of the article, means for supporting said first and second mold plates for movement toward and away from each other between a mold open position and a mold closed position, a mold core projecting from said first mold plate in a direction parallel to the direction of movement of said first and second mold plates relative to one another, said mold core including a free end and an annular outer mold surface portion tapering inwardly in said direction and toward said free end and being adapted to form the interior surface of the cylindrical sidewall of the article, said annular outer mold surface portion including a plurality of generally teardrop-shaped projections, each of said teardrop-shaped projections being adapted to form a teardrop-shaped depression in the interior surface of the cylindrical sidewall of the article, each of said teardrop-shaped projections including a narrowed end portion and an enlarged end portion converging toward said narrowed end portion thereof in said direction and toward said first mold plate, a plurality of mold sidewall assemblies, each of said mold sidewall assemblies including an inwardly facing molding surface adapted to form a portion of the exterior surface of the cylindrical sidewall of the article, means for supporting said mold sidewall assemblies for movement between a mold closed position wherein said inwardly facing molding surfaces of said mold sidewall assemblies, said inwardly facing molding surface of said second mold plate, and said mold core cooperate to define at least part of a mold cavity which conforms to the desired dimensions of the article, and a mold open position wherein each of said mold sidewall assemblies is displaced outwardly of its mold closed position, and a plurality of core pins, each of said core pins being mounted on one of said mold sidewall assemblies and projecting from said inwardly facing molding surface thereof, each of said core pins engaging the enlarged end portion of one of said teardrop-shaped projections of said mold core when said mold sidewall assemblies are in their mold closed positions, and each of said core pins being adapted to form a hole in the cylindrical sidewall of the article, the hole being recessed in one of the teardrop-shaped depressions from the surrounding portion of the annular interior surface of the article.

35. A mold assembly as set forth in claim 34 wherein each of said teardrop-shaped projections includes an outer surface having a longitudinal center line parallel to said direction, said center line extending tangentially to the outermost point of said respective enlarged end portion, and said center line defining an outer edge portion of said respective teardrop-shaped projection, wherein said narrowed end portion of each of said teardrop-shaped projections gradually merges into said annular outer surface portion so as to provide a smooth transition therebetween, wherein each of said teardrop-shaped projections has a periphery which is generally arcuate so as to converge into said surrounding annular outer surface portion to form a gradual transition therebetween, and wherein said enlarged end portion of each of said teardrop-shaped projections includes a center, each of said teardrop-shaped projections becoming gradually shallower as the periphery thereof is approached from said center thereof.

* * * * *